United States Patent
Shimada et al.

(10) Patent No.: US 6,382,380 B1
(45) Date of Patent: May 7, 2002

(54) HYDRAULIC POWER TRANSMISSION JOINT

(75) Inventors: Kazuhisa Shimada; Tadahiko Kato; Yoshiaki Tajima, all of Shizuoka; Toshiharu Takasaki, Kanagawa; Hirotaka Kusukawa, Machida; Shigeo Murata, Kanagawa, all of (JP)

(73) Assignees: Fujiunvance Co., Shizuoka; Nissan Motor Co., Ltd., Kanagawa, both of (JP)

( * ) Notice: Subject to any disclaimer, the term of this patent is extended or adjusted under 35 U.S.C. 154(b) by 0 days.

(21) Appl. No.: 09/577,583

(22) Filed: May 25, 2000

(30) Foreign Application Priority Data

May 28, 1999 (JP) ............................................ 11-149352

(51) Int. Cl.$^7$ .............................................. F16D 31/02
(52) U.S. Cl. ...................... 192/59; 137/539; 192/103 F; 192/104 F; 464/27
(58) Field of Search .............................. 192/59, 60, 61, 192/103 F, 104 F; 137/539; 417/549; 60/489; 464/27

(56) References Cited

U.S. PATENT DOCUMENTS

| | | | | |
|---|---|---|---|---|
| 3,010,435 A | * | 11/1961 | Abrams | ...................... 137/539 |
| 4,204,560 A | * | 5/1980 | Eriksen | ...................... 137/539 |
| 5,024,309 A | * | 6/1991 | Takemura et al. | ............ 192/60 |
| 5,037,353 A | * | 8/1991 | Suzuki et al. | .................. 464/27 |
| 5,706,658 A | * | 1/1998 | Kato et al. | ...................... 60/487 |
| 6,257,387 B1 | * | 7/2001 | Shimada et al. | ............... 192/59 |
| 6,293,381 B1 | * | 9/2001 | Shimada et al. | ......... 192/103 F |

* cited by examiner

Primary Examiner—Rodney H. Bonck
(74) Attorney, Agent, or Firm—Wenderoth, Lind & Ponack, L.L.P.

(57) ABSTRACT

A torque varying mechanism comprises an accommodation hole that has a relief hole formed in its bottom and that receives a check ball therein. The accommodation hole is configured so as to present a relationship in which the area of flow passage between the accommodation hole and the check ball increases linearly as a function of the amount of displacement of the check ball after opening of the relief hole, after which the flow passage area keeps a unvarying value. A hysteresis characteristic is imposed on a switching point where switching is made between a high torque transmission characteristic and a low torque transmission characteristic relative to an increase and a decrease of the vehicle velocity.

3 Claims, 11 Drawing Sheets

F I G. 13
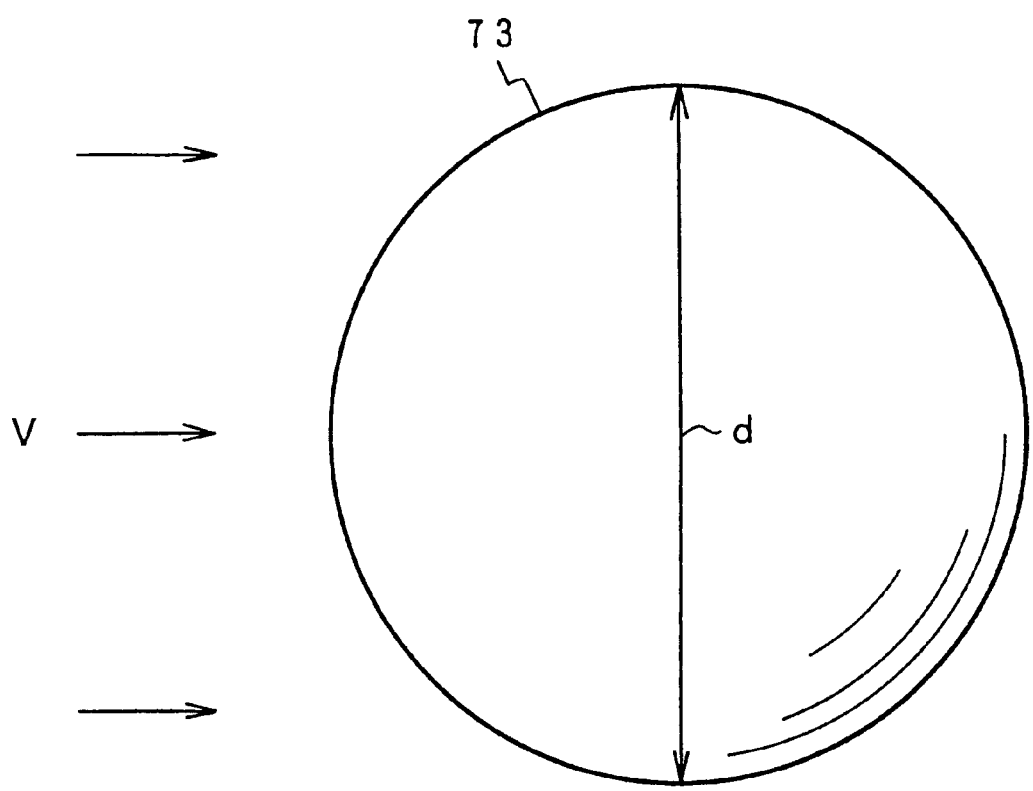

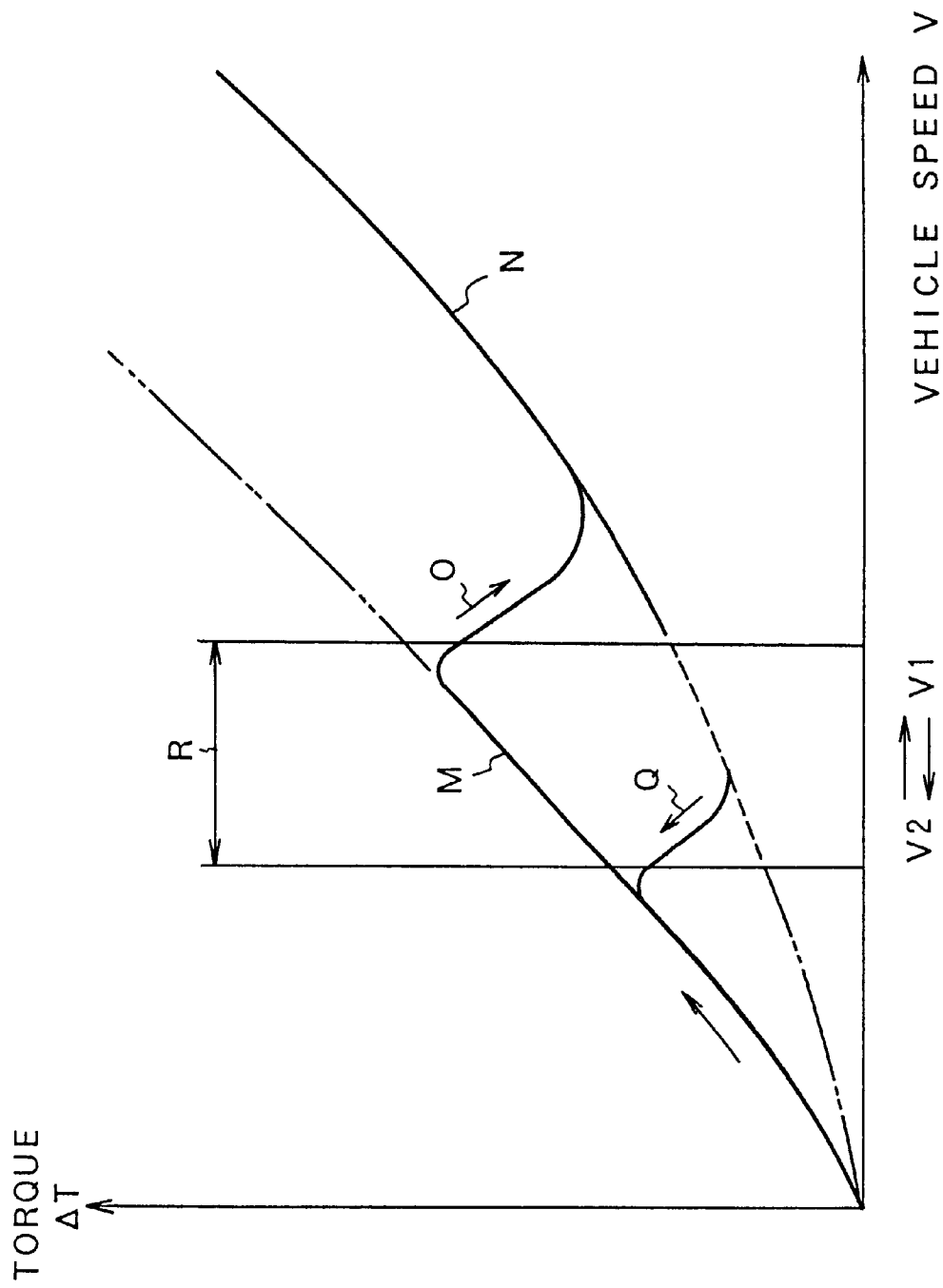

HYDRAULIC POWER TRANSMISSION JOINT

BACKGROUND OF THE INVENTION

1. Field of the Invention

The present invention relates generally to a hydraulic power transmission joint for use in 4 wheel-drive motor vehicles for the distribution of driving forces between front and rear wheels, and more particularly to a hydraulic power transmission joint designed to suppress possible sudden torque variations upon the switching of torque transmission characteristics by use of a centrifugal torque varying mechanism.

2. Description of the Related Arts

Such a conventional hydraulic power transmission joint is known from U.S. Pat. Nos. 5,706,658 and 5,983,635.

This hydraulic power transmission joint comprises a housing coupled to one of input and output shafts that are capable of relative rotations and having a cam face formed on its inner side surface; a rotor coupled to the other of said input and output shaft and being rotatably accommodated in the housing, the rotor having a plurality of axially extending plunger chambers; a plurality of plungers each being reciprocatively accommodated in each of the plurality of plungers under a biasing force of return springs, the plurality of plungers being operated by the cam face upon the relative rotations of the input and output shafts; a discharge hole formed in the rotor and leading to the plurality of plunger chambers; and an orifice having a high-pressure chamber that leads to the discharge hole, the orifice generating a flow resistance under the action of flow of oil discharged by operations of the plurality of plungers.

In the hydraulic power transmission joint being currently developed by the present inventors, a valve block is coupled to the rotor for rotations jointly therewith and is provided with a centrifugal torque varying mechanism. The centrifugal torque varying mechanism has a weight which when the vehicle velocity exceeds a predetermined level, pivots around a weight fulcrum by a centrifugal force to open a relief hole that has been blocked by a check valve so far, thereby achieving a release of the high-pressure oil. Switching is thus made to a lower torque transmission characteristic than the torque transmission characteristic used for the duration in which the relief hole is closed, to thereby prevent the temperature of the joint from raising due to the increased vehicle velocity.

Referring to FIG. 1, there is shown by way of example a centrifugal torque varying mechanism comprising a valve block 101 that includes a relief hole 102 leading to a high-pressure chamber. When the vehicle velocity V exceeds a predetermined vehicle velocity Vt as seen in FIG. 3, a weight can pivot by a centrifugal force so that a member 104 for receiving a check ball 103 is displaced to the direction of an arrow E, allowing the check ball 103 to open the relief hole 102. At that time, oil is released through the relief hole 102 as indicated by an arrow F. A large variation occurs in the area of flow passage when the relief hole 102 is opened by the check ball 103, and as indicated by an arrow J1 of FIG. 3 the torque transmission characteristic is switched from a first torque transmission characteristic H to a lower second torque transmission characteristic I, resulting in a large torque reduction rate. When the vehicle velocity V drops to below the predetermined vehicle velocity Vt and the weight returns to its original position after the switching to the second torque transmission characteristic I the member 104 receiving the check ball 103 is displaced to the direction of an arrow G as seen in FIG. 2, allowing the check ball 103 to block the relief hole 102. The torque transmission characteristic upon this switching as indicated by an arrow J2 of FIG. 3 is switched from the second torque transmission characteristic I to the initial first torque transmission characteristic H, resulting in a large torque increase rate.

In case of such a hydraulic power transmission joint, however, the area of flow passage changes to a large extent when the relief hole is opened or closed by the check ball, with the result that the torque transmission characteristics are liable to be influenced by the variation of flow rate and the torque transmission characteristics may vary in a brief period of time, thus disadvantageously affecting the vehicle behaviors. Furthermore, the switching of the torque transmission characteristics is effected using the predetermined vehicle velocity Vt as the reference value, and hence if the vehicle velocity is in the vicinity of the vehicle velocity Vt, then even a slight variation may induce a switching of the torque transmission characteristics in spite of the travelling at a fixed velocity, which will also affect the vehicle behaviors.

SUMMARY OF THE INVENTION

The present invention provides a hydraulic power transmission joint capable of reducing the torque variation rate upon the switching of torque transmission characteristics, preventing frequent switching of the torque transmission characteristics when travelling at an unvarying velocity, and alleviating influences on the vehicle behaviors.

According to an aspect of the present invention there is provided a hydraulic power transmission joint adapted to be interposed between an input shaft and an output shaft that are rotatable relative to each other, to transmit torque as a function of the rotational-speed difference between the input and output shafts, the hydraulic power transmission joint comprising a housing coupled to one of the input and output shafts and having a cam face formed on its inner side surface; a rotor coupled to the other of the input and output shafts and being rotatably accommodated in the housing, the rotor having a plurality of axially extending plunger chambers; a plurality of plungers each being reciprocatively accommodated in each of the plurality of plungers under a biasing force of return springs, the plurality of plungers being operated by the cam face upon the relative rotations of the input and output shafts; an orifice formed in a valve block coupled to the rotor, for generating a flow resistance under the action of flow of oil discharged by operations of the plurality of plungers; and a torque varying mechanism provided in the valve block and having a weight that is pivoted by a centrifugal force to allow a check ball to move to open a relief hole, for the relief of hydraulic pressure, thereby switching a first torque transmission characteristic to a second torque transmission characteristic lower than the first one.

Such a hydraulic power transmission joint of the present invention is characterized in that the torque varying mechanism includes an accommodation hole for receiving the check ball therein, the relief hole being formed in the bottom of the accommodation hole, the accommodation hole being configured such that the area of flow passage between the accommodation hole and the check ball increases linearly as a function of the amount of displacement of the check ball after opening of the relief hole, after which the area of flow passage keeps an unvarying value. By virtue of this, a hysteresis characteristic is obtained in which when a predetermined first vehicle velocity is reached, the weight pivots to allow the check ball to move to open the relief hole, thereby effecting a switching from the first torque transmission characteristic to the second torque transmission characteristic lower than the first one, and in which when the vehicle velocity drops from the first vehicle velocity to the second vehicle velocity lower than the first one, the weight returns to its original position to allow the check ball to close the relief hole, thereby effecting a switching from the second torque transmission characteristic to the first torque transmission characteristic.

The accommodation hole may be flared in section with a plurality of steps from an opening of the relief hole toward an opening of the accommodation hole for example. The accommodation hole may have in section a flared portion with a plurality of steps from the opening of the relief hole toward the opening of the accommodation hole, for example, the accommodation hole further having a straight portion contiguous with the flared portion in the direction of flare.

According to the thus constructed hydraulic power transmission joint of the present invention, a gentler variation in the area of flow passage is achieved relative to the amount of displacement of the check ball induced by the weight provided in the torque varying mechanism, thereby making gentler the variation of the torque transmission characteristic relative to the variation of flow rate. This results in a reduced torque variation rate upon the switching of the torque transmission characteristics, contributing to stabilized vehicle behaviors. Due to the provision of the hysteresis characteristic in which the switching velocity from the first torque transmission characteristic to the second torque transmission characteristic is different from the switching velocity from the second torque transmission characteristic to the first torque transmission characteristic, frequent switching of the torque transmission characteristics upon the low-velocity travelling can be prevented to diminish the influences on the vehicle behaviors.

The above and other objects, aspects, features and advantages of the present invention will become more apparent from the following detailed description when taken in conjunction with the accompanying drawings.

BRIEF DESCRIPTION OF THE DRAWINGS

FIG. 13 is an explanatory diagram of the flow velocity acting on the check ball; and FIG. 14 is a graphic representation showing the torque transmission characteristics relative to the vehicle velocities, of the torque varying mechanism of the present invention.

DETAILED DESCRIPTION OF THE PREFERRED EMBODIMENTS

Figure 4:
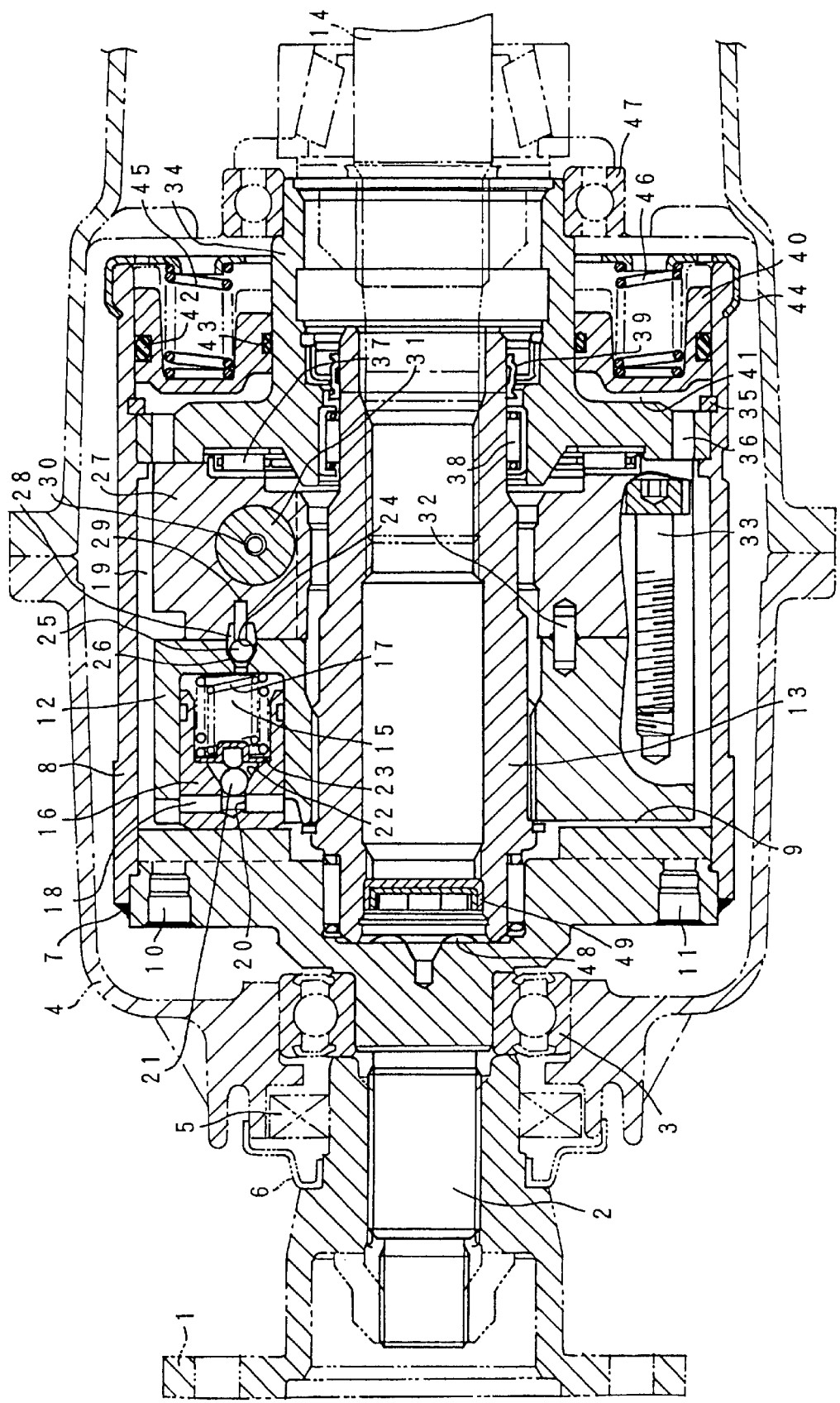
FIG. 4 is a sectional view of an embodiment of the present invention.

FIG. 4 is a sectional view of an embodiment of a hydraulic power transmission joint in accordance with the present invention. A companion flange 1 is coupled to a propeller shaft associated with a front wheel driving shaft. A cam housing shank 2 is inserted into the companion flange 1 for spline coupling. The cam housing shank 2 has on its outer periphery a front bearing 3 by way of which the cam housing shank 2 is supported on a differential gear case 4. Between the differential gear case 4 and the companion flange 1 there are provided a seal member 5 and a cover 6 that prevent in cooperation entrance of foreign particles and outflow of differential gear oil. A housing 8 is secured at a weld 7 to the right-hand end of the cam housing shank 2. On its inner side surface, the cam housing shank 2 is provided with a cam face 9 having two or more raised portions. The cam housing shank 2 serves as a cam by way of this cam face 9. Plugs 10 and 11 are inserted into the cam housing shank 2, for allowing oil to be injected into the interior of the joint or discharged therefrom. A rotor 12 is rotatably accommodated in the housing 8 and is engaged with a main shaft 13 for integral rotation therewith. A drive pinion gear 14 associated with a rear differential gear is fixedly inserted into the interior of the main shaft 13 so that the main shaft 13 rotates jointly with the drive pinion gear 14. The rotor 12 is formed with a plurality of axially extending plunger chambers 15, each of which houses a plunger 16 slidably by way of a return spring 17. An intake passage 18 is formed in the plunger 16 at its head side that communicates with a low-pressure chamber 19. The intake passage 18 opens to the plunger chamber 15 by way of a communication hole 20 that is opened or closed by a one way valve block 21 for intake in the form of a ball. The interior of the plunger chamber 15 is formed with a valve seat 22 on which the one way valve block 21 is seated. A check plug 23 is disposed at the stepped portion of the valve seat 22. Between the check plug 23 and the one way valve block 21 there is interposed a check spring not shown that serves to urge the one way valve block 21 for positioning. The return spring 17 intervenes between the check plug 23 and the bottom of the rotor 12. A discharge hole 24 is formed in the rotor 12 so as to open to the plunger chamber 15. A one way valve block 25 for discharge in the form of a ball is disposed in the discharge hole 24. The discharge hole 24 is formed with a valve seat 26 on which the one way valve block 25 is seated.

The rotor 12 is followed by a valve block 27 which is provided with a high-pressure chamber 28 that communicates with the discharge hole 24 of the rotor 12. A restriction member 29 projects into the high-pressure chamber 28 of the valve block 27 for positioning the one way valve block 25 at a predetermined location. The valve block 27 is provided with an orifice member 31 having an orifice that opens to the high-pressure chamber 28. The valve block 27 and the rotor 12 are positioned relative to each other by a pin 32 and are rigidly fastened together by a bolt 33. When the plunger 16 is in its intake stroke, the one way valve block 21 for intake at the head of the plunger 16 is opened allowing oil to flow through the low-pressure chamber 19, intake passage 18 and the communication hole 20 into the plunger chamber 15. At that time, the one way valve block 25 for discharge at the discharge hole 24 of the rotor 12 is closed uniting a back flow of oil from the high-pressure chamber 28. On the contrary, when the plunger 16 is in its discharge stroke, the one way valve block 25 at discharge side is opened allowing oil within the plunger chamber 15 to flow through the discharge hole 24 and high-pressure chamber 28 into the orifice 30. At that time, the one way valve block 21 for intake is closed to prevent oil from leaking through the communication hole 20 and intake passage 18 into the low-pressure chamber 19. The bearing retainer 34 is rigidly press fitted into the housing 8 and is positioned by a snap ring 35. The bearing retainer 34 is formed with a through-hole 36 that communicates with the low-pressure chamber 19. Needle bearings 37 and 38 are interposed between the bearing retainer 34 and the valve block 27 and between the bearing retainer 34 and the main shaft 13, respectively. An seal ring 39 is also provided between the bearing retainer 34 and the main shaft 13 for the prevention of an outflow of oil. Outside the bearing retainer 34 there is slidably provided an accumulator piston 40 for absorbing oil thermal expansion and contraction, the accumulator piston 40 defining an accumulator chamber 41 that communicates with the low-pressure chamber 19 by way of the through-hole 36 in the bearing retainer 34. O-rings 42 and 43 are interposed between the accumulator piston 40 and the housing 8 and between the accumulator piston 40 and the bearing retainer 34, respectively. Return springs 45 and 46 are disposed between an accumulator retainer 44 and the bottom of the accumulator piston 40. The extended portion of the bearing retainer 34 has on its outer periphery a rear bearing 47 by way of which the bearing retainer 34 is supported by the differential gear case 4. A lubricant groove 48 and a seal member 49 are provided in the left-hand opening of the main shaft 13.

Figure 5:
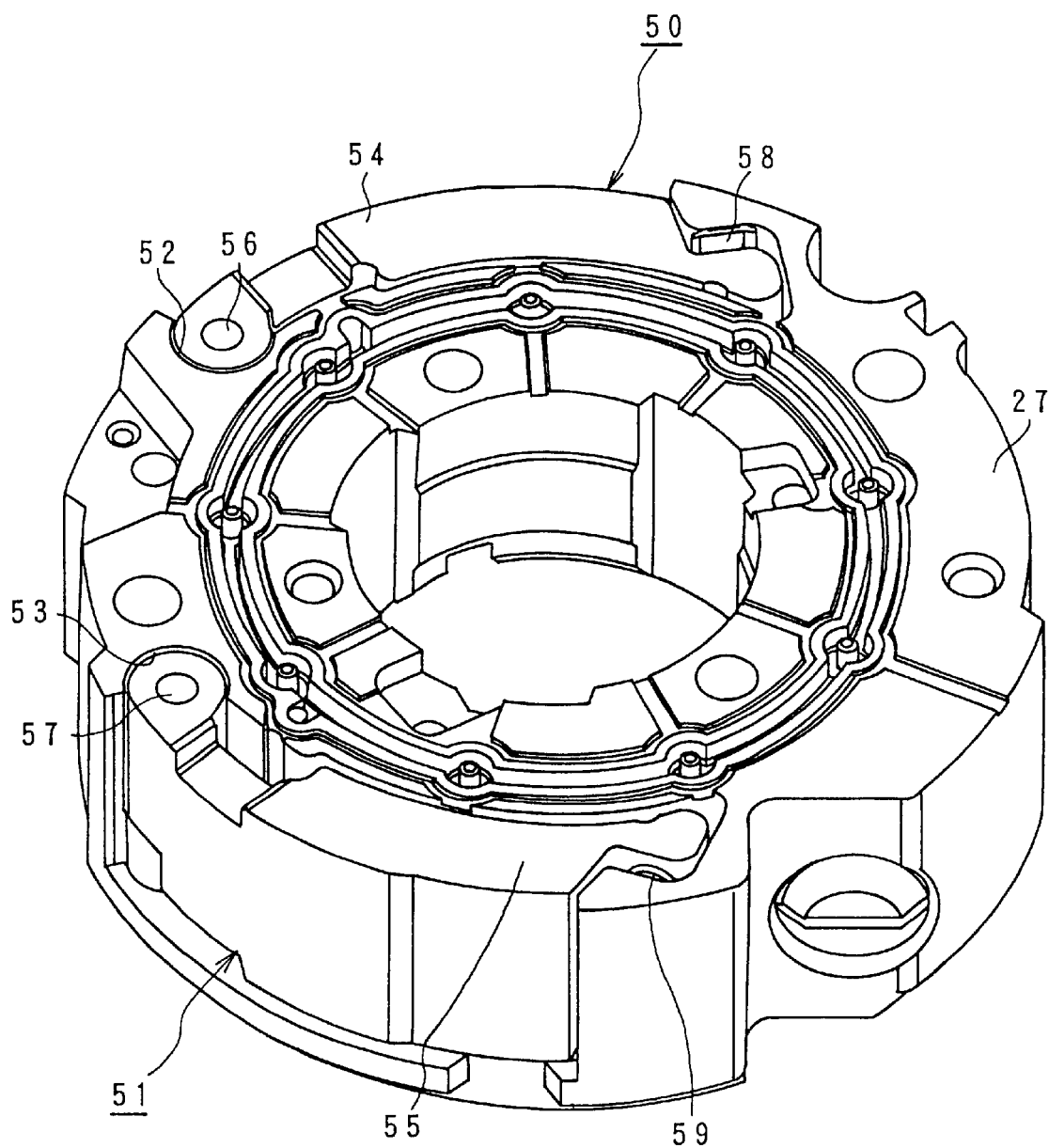
FIG. 5 is a perspective view of a valve block.
Figure 6:
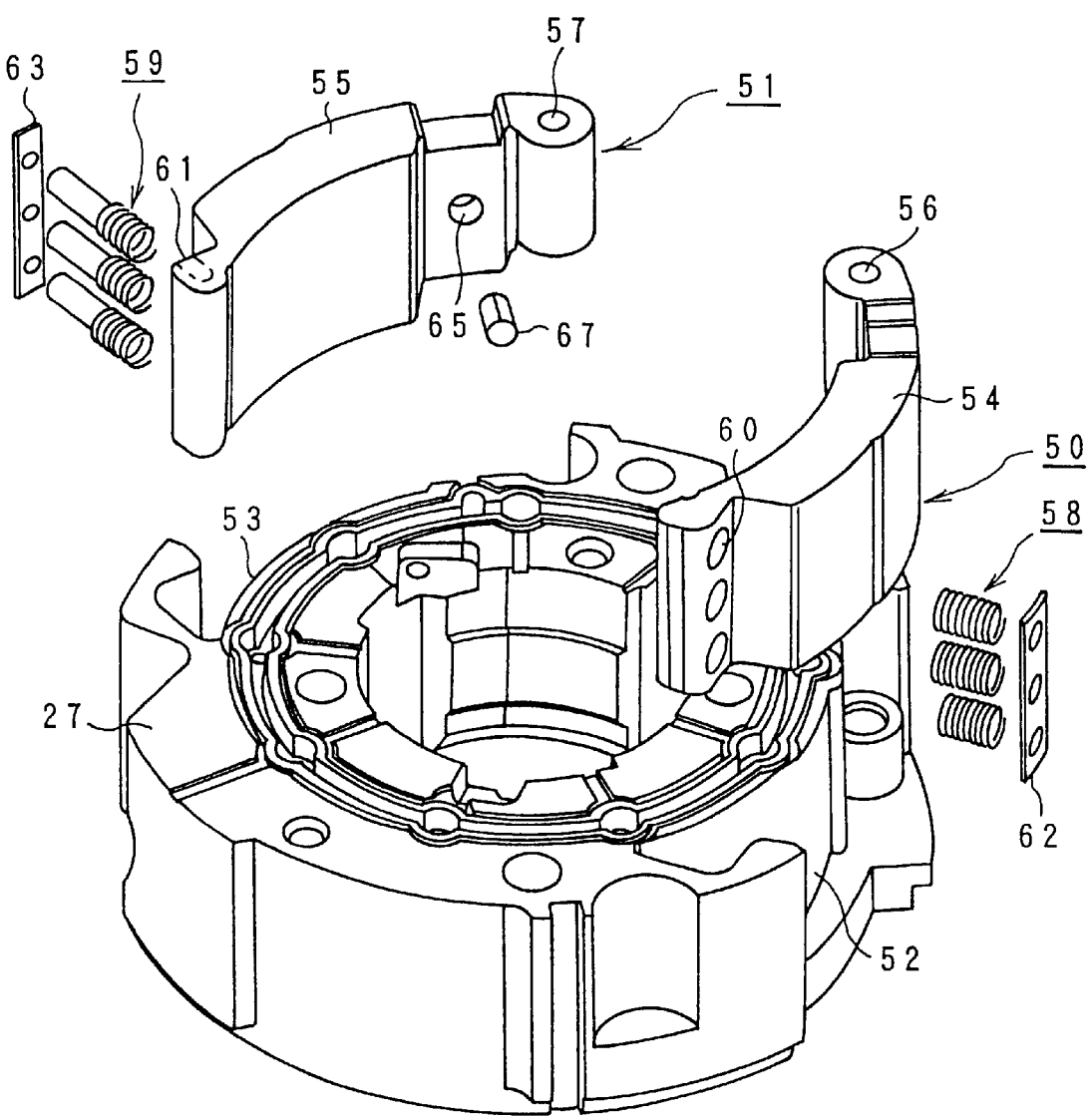
FIG. 6 is an exploded view of the valve block.

FIG. 5 is a perspective view of the valve block 27 of FIG. 4. The valve block 27 is coupled to the rotor 12 for rotating jointly therewith. The valve block 27 is provided with a pair of centrifugal torque varying mechanisms generally designated at 50 and 51, respectively. The outer periphery of the valve block 27 is formed with a couple of accommodation recesses 52 and 53 which receive weights 54 and 55, respectively, in a pivotal manner. The weights 54 and 55 can pivot outwardly around weight fulcrums 56 and 57 by a centrifugal force when the vehicle velocity exceeds a predetermine value. Opposite to the weight fulcrums 56 and 57 of the weights 54 and 55 in the accommodation recesses there are interposed return springs 58 and 59 between the weights and the valve block 27. More specifically, as is clear from an exploded view of FIG. 6, the weights 54 and 55 are provided with three spring accommodation holes 60 and 61, respectively, for receiving the springs 58 and 59, respectively. The spring accommodation holes 60 and 61 receive one ends of three return springs 58 and 59, with the other ends thereof being retained by retainers 62 and 63, respectively, provided on the valve block 27.

Figure 7:
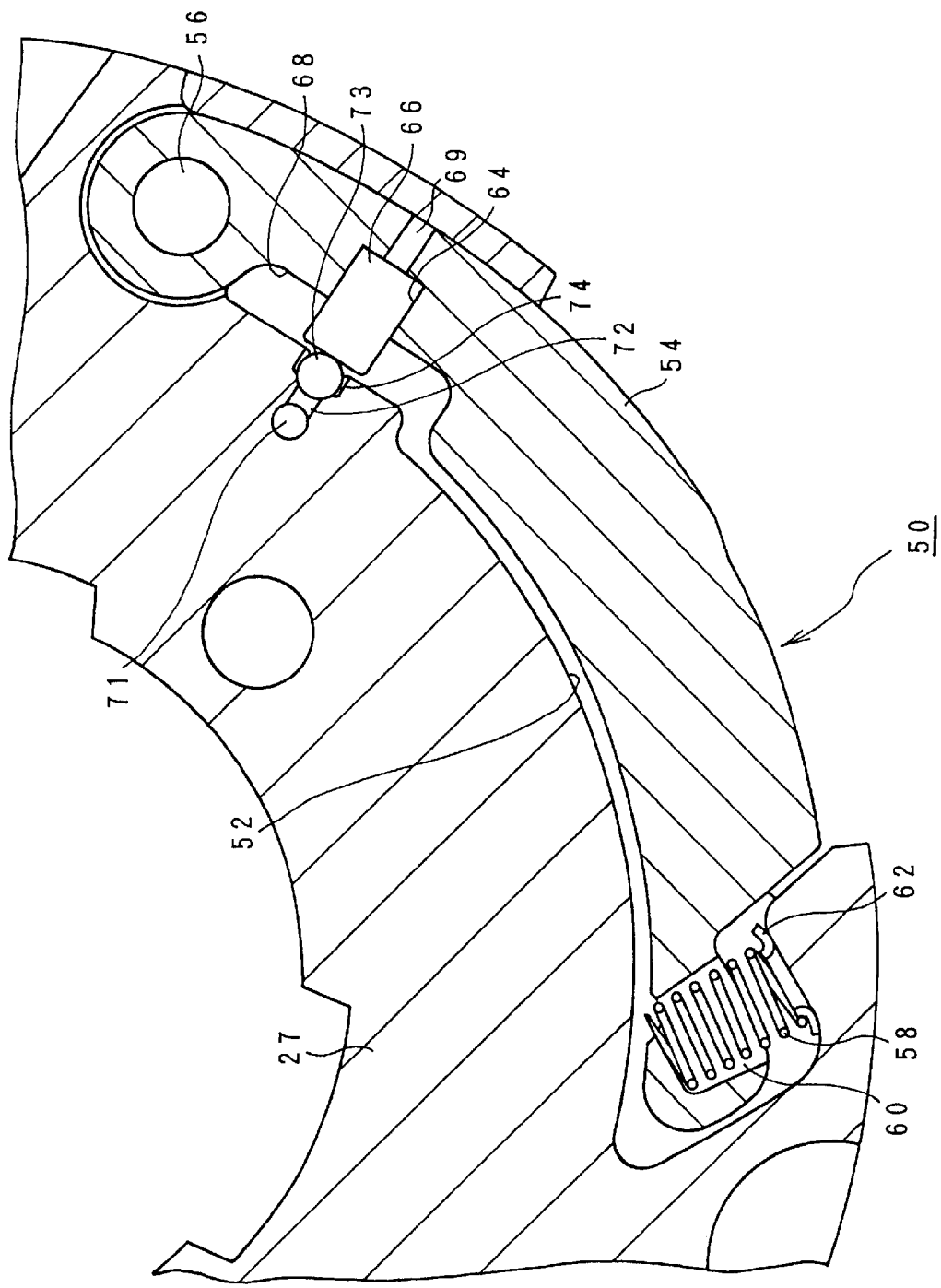
FIG. 7 is an enlarged sectional view of a centrifugal torque varying mechanism.

FIG. 7 is an enlarged sectional view of the centrifugal torque varying mechanism 50 of FIG. 5. The accommodation recess 52 is formed in the outer periphery of the valve block 27 so as to receive the weight 54 pivotally around the weight fulcrum 56. At the end opposite to the weight fulcrum 56, the weight 54 is formed with the spring accommodation holes 60 for receiving one ends of the return springs 58. The other ends of the return springs 58 are retained by the retainer 62 provided on the valve block 27 so that the return springs 58 can urge the weight 54 inward. A pin insertion hole 64 is formed in the inside of the weight 54, with a pin 66 being press-fitted thereinto. The pin 66 is press-fitted in such a manner as to project into a recessed portion formed in the weight 54. The pin insertion hole 64 is formed with a through-hole 69 that opens to the exterior of the weight 54. The valve block 27 is formed with a high-pressure chamber 71 and a relief hole 72 in communication with the high-pressure chamber 71. The valve block 27 is further formed with an accommodation hole 74 serving to receive a check ball 73 and communicating with the relief hole 72. The check ball 73 is pressed by the pin 66 press-fitted into the weight 54 urged by the return spring 58, to thereby block the relief valve 72. Once the vehicle velocity exceeds a predetermined value, the weight 54 pivots outward around the weight fulcrum 56 by a centrifugal force against the biasing force of the return spring 58, allowing the pin 66 to be disengaged from the check ball 73. This eliminates the force pressing the check ball 73 so that the check ball 73 can open the relief hole 72 by the hydraulic pressure from the high-pressure chamber 71, whereupon the hydraulic pressure within the high-pressure chamber 71 enters the recessed portion 68 for release to the low pressure side. The torque transmission characteristic is thus switched to a lower torque transmission characteristic whereby the temperature of the joint is prevented from becoming higher with the increased vehicle velocity.

Figure 8:
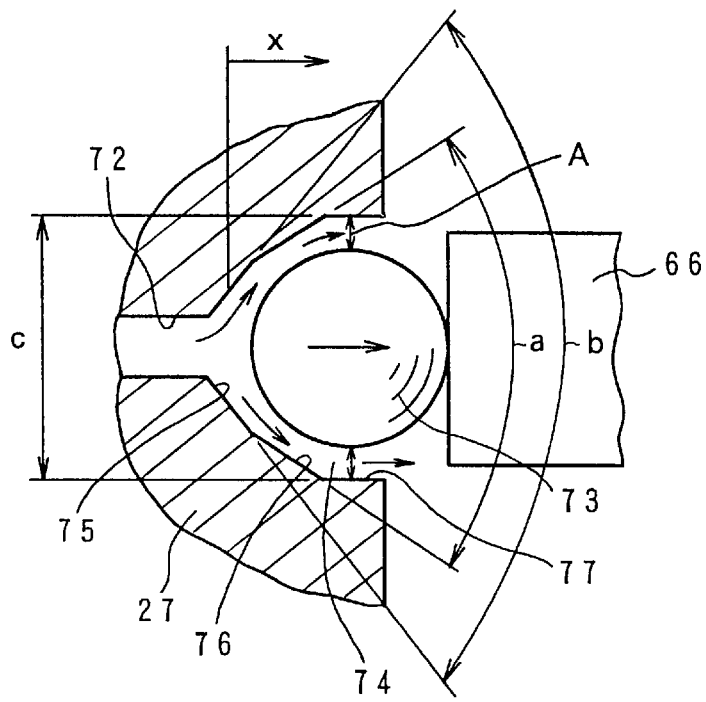
FIG. 8 is an explanatory diagram of the relief-open state of FIG. 7.
Figure 9:
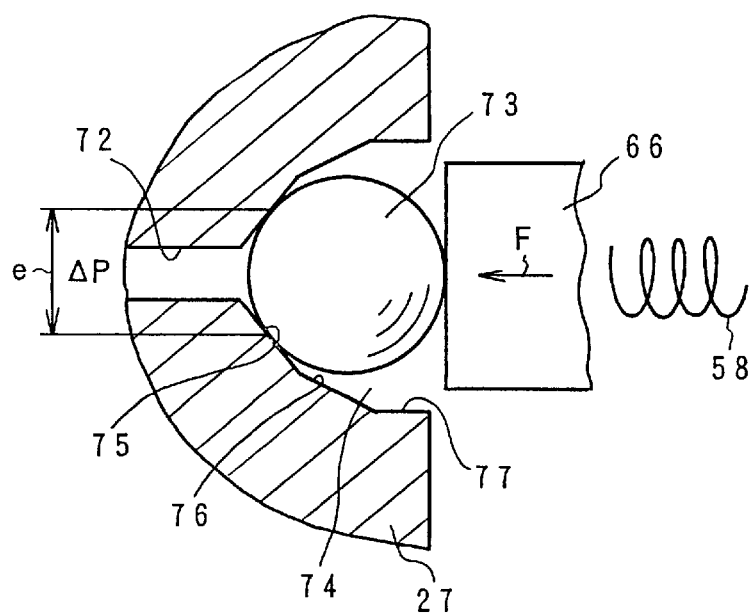
FIG. 9 is an explanatory diagram of the relief-closed state of FIG. 7.
Figure 10:
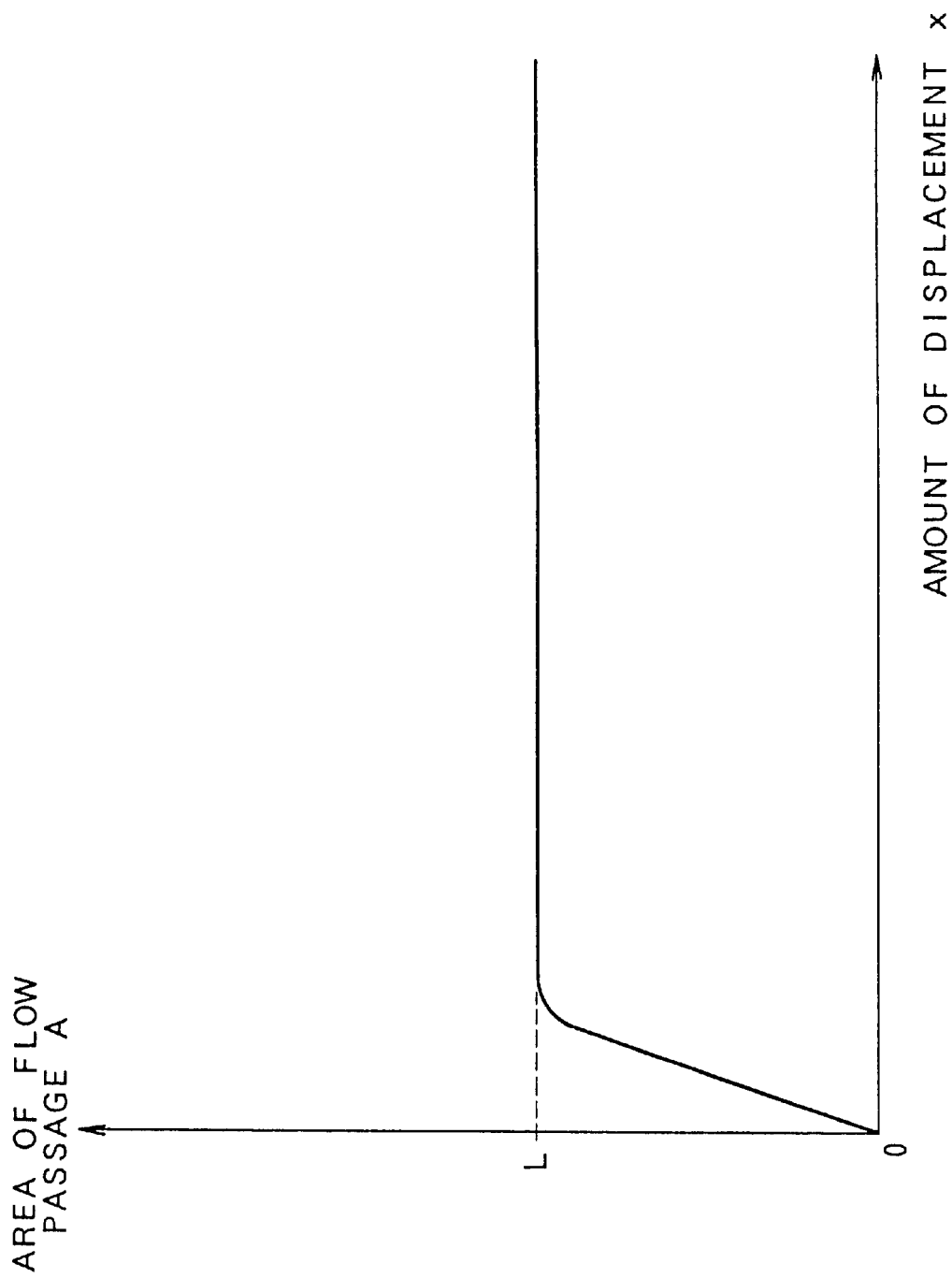
FIG. 10 is a graphic representation showing the relationship between the amount of displacement of a check ball of FIG. 7 and the area of fluid passage.

FIG. 8 depicts the relief-open state of the relief portion of the centrifugal torque varying mechanisms 50 and 51, and FIG. 9 depicts the relief-closed state of the same. The relief hole 72 leading to the high-pressure chamber 71 is formed in the valve block 27. The accommodation hole 74 leading to the relief valve 72 is also formed in the valve block 27 for receiving the check ball 73. The accommodation hole 74 includes a first-step flared portion 75 contiguous with the opening of the relief hole 72, a second-step flared portion 76 contiguous with the first flared portion 75, and a straight portion 77 continuous with the second step flared portion 76. The first-step and second-step flared portions 75 and 76 are designed to have their respective predetermined cone angles b and a. The straight portion 77 is designed to have a predetermined diameter c. Herein, let the amount of displacement of the check ball 73 and the area of flow passage in the opened state be x and A, respectively, in FIG. 8. Then, the cone angle b of the first-step flared portion 75, the cone angle a of the second-step flared portion 76 and the diameter c of the straight portion 77 are defined such that with respect to the amount of displacement x, the area of flow passage A continues to take a certain value L after linear increase as shown in FIG. 10.

Figure 1:
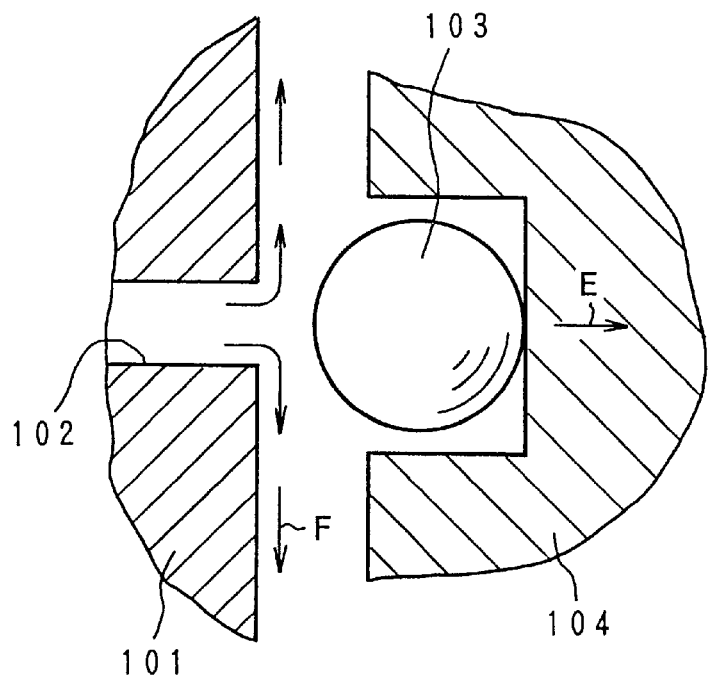
FIG. 1 is an explanatory diagram of the relief-open state of a torque varying mechanism provided in a joint being currently developed by the present inventors.
Figure 2:
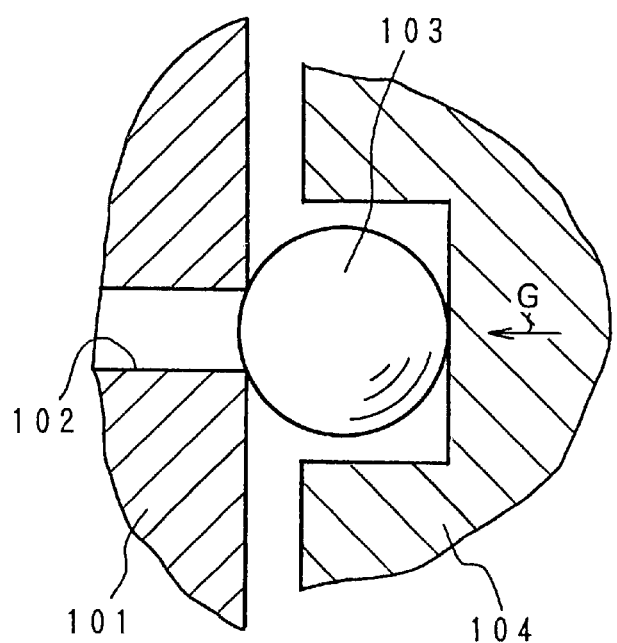
FIG. 2 is an explanatory diagram of the relief-closed state of FIG. 1.
Figure 3:
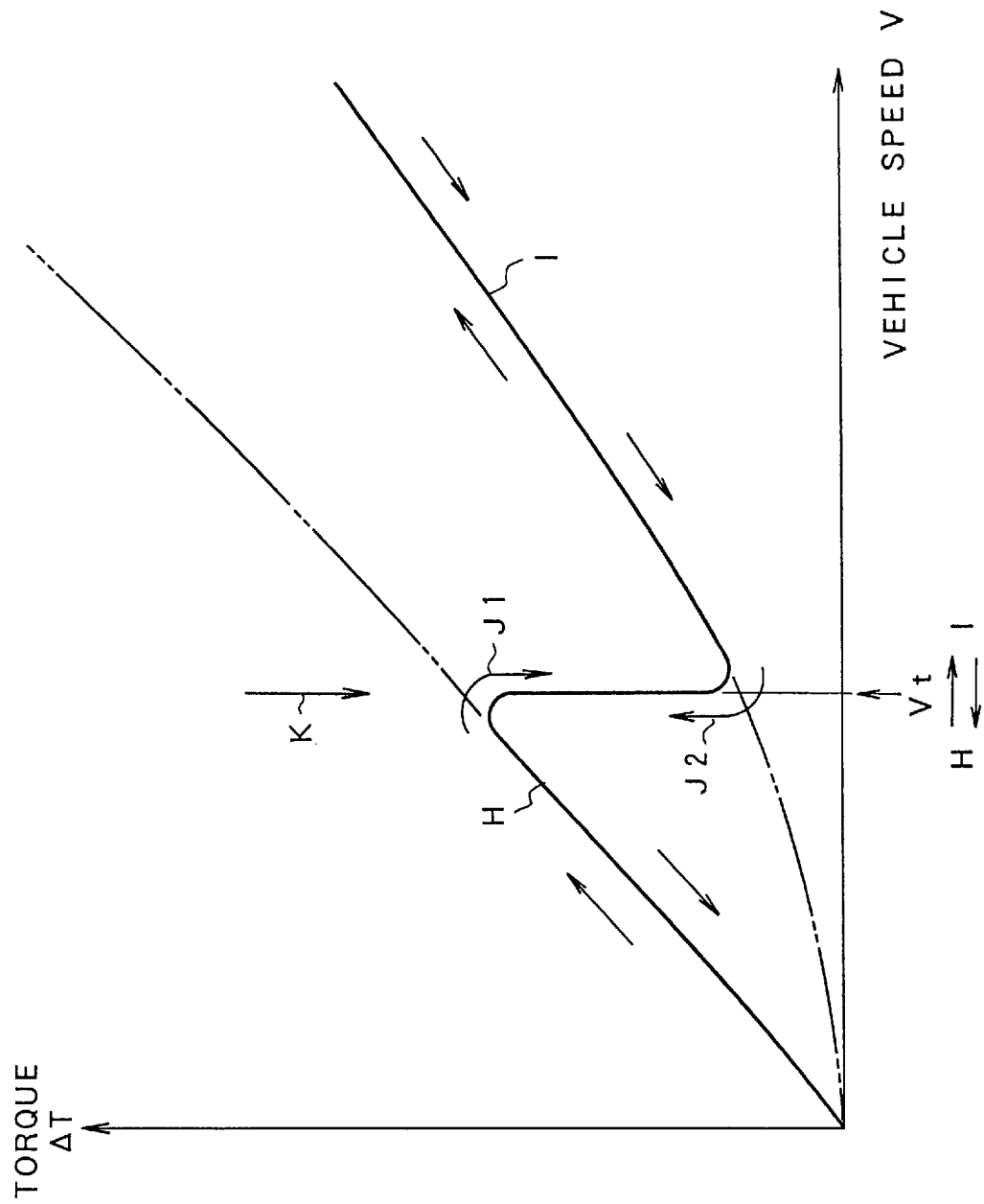
FIG. 3 is a graphic representation of torque transmission characteristics relative to vehicle velocities of FIGS. 1 and 2.
Figure 11:
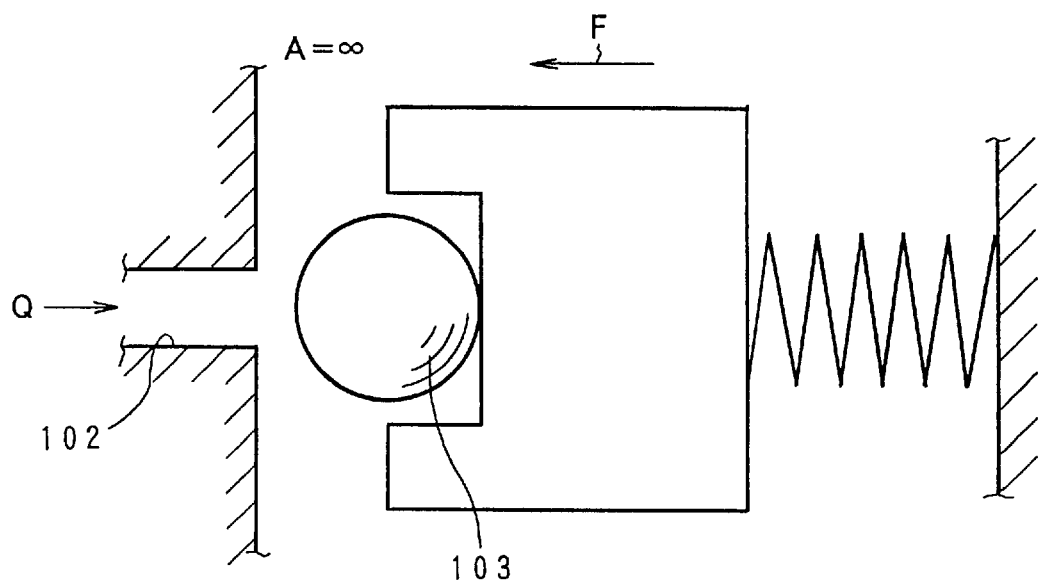
FIG. 11 is an explanatory diagram showing the major part of the torque varying mechanism of FIGS. 1 and 2.
Figure 12:
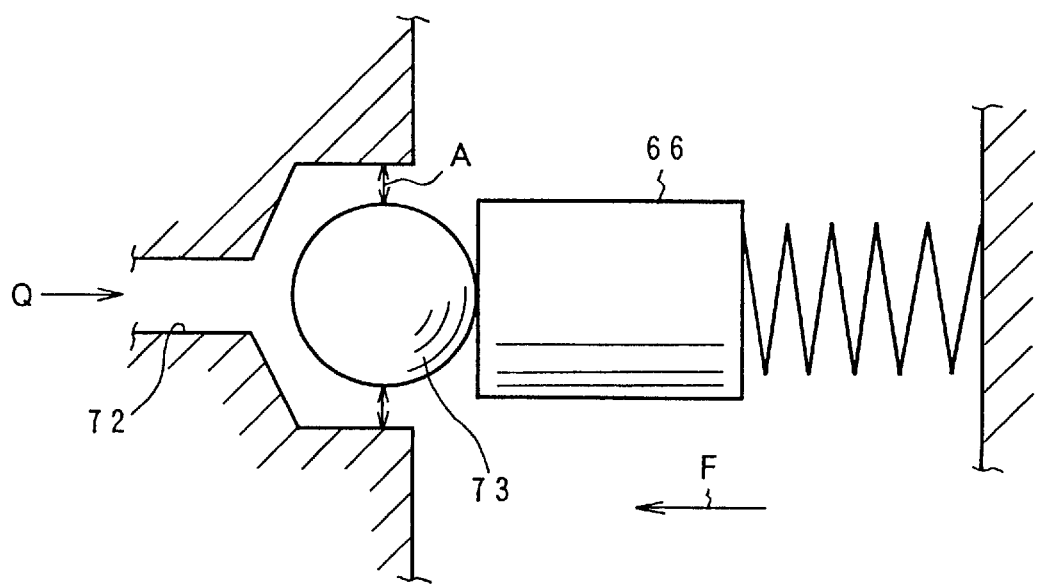
FIG. 12 is an explanatory diagram showing the major part of the torque varying mechanism in accordance with the present invention.

On the contrary, in the relief-closed state of FIG. 9, let a hydraulic pressure be $\Delta P$, the area of contact over which the hydraulic pressure $\Delta P$ acts on the check ball 73 be e, and a pressing force with which the return spring 58 presses the check ball 73 be F. The pressing force F is a load obtained by leverage comprised of the weight 54 acting as a lever, the weight fulcrum 56, the point where force is applied of the return spring 58, and the point on which the pin 66 acts. The pressing force F is a load that is amplified by an amplification ratio in the form of a certain lever ratio of the distance between the fulcrum 56 and the return spring 58 to the distance between the fulcrum 56 and the pin 66 in FIG. 5, the load being applied to the check ball 73 by way of the weight 54 and the pin 66. Therefore, if $$F > \Delta P \cdot e$$

then, the check ball 73 blocks the relief hole 72. If with the vehicle velocity V exceeding a predetermined first velocity V1 the weight 54 works by the centrifugal force and $$(\Delta P \cdot e) + (\text{centrifugal force}) > F$$

results, then the check ball 73 opens the relief valve 72. When the check ball 73 opens the relief valve 72 as shown in FIG. 8, the variations of the area of flow passage A relative to the amount of displacement x of the check ball 73 and thus the variations of the torque transmission characteristics relative to the variance of flow rate will become gentler since the accommodation hole 74 for the check ball 73 has the two-step flared portions consisting of the first-step flared portion 75 and the second-step flared portion 76. In case of FIGS. 1 and 2, the area of flow passage A becomes infinite when the check ball 103 opens the relief hole 102 as in FIG. 11. As opposed to this, in the embodiment of the present invention, the area of flow passage A after relief-opening is restricted to keep a certain value L irrespective of the amount of displacement x of the check ball 73 as shown in FIG. 12. Thus, in FIG. 11 the check ball 103 is subjected to a smaller drag as a result of outflow of oil through the relief hole 102, whilst in FIG. 12 the check ball 73 can experience a larger drag by the restriction of the area of flow passage A.

The drag D which the check ball 73 undergoes is given as $$D = C_D \frac{1}{2} \rho V^2 S \quad (1)$$

where S: check ball project area,

V: flow velocity,

ρ: fluid density, and $C_D$: resistance coefficient

The project area S of the check ball 73 can be expressed as $$S = \frac{\pi}{4} d^2 \quad (2)$$

where d: diameter of the check ball 73

FIG. 13 illustrates exclusively the check ball 73 of FIG. 12 subjected to oil from the orifice. The flow velocity V at that time is given as $$V = \frac{Q}{A}$$

where Q: flow rate, and

A: the area of flow passage

Furthermore, the resistance coefficient $C_D$ is set to 0.34 for example. By restricting the area of flow passage A after relief opening in this manner, it is possible to increase the drag D to which the check ball 73 is subjected. For this reason, a hysteresis as in the torque transmission characteristic relative to the vehicle velocity in FIG. 14 can be provided in which a vehicle velocity V1 (first vehicle velocity) where a high torque transmission characteristic (first torque transmission characteristic) M is switched to a low torque transmission characteristic (second torque transmission characteristic) N is different from a vehicle velocity V2 (second vehicle velocity) where the low torque transmission characteristic N is switched to the high torque transmission characteristic M. This prevents frequent switchings of the torque transmission characteristics upon the travel at a certain velocity. The operative function will then be described. For the duration in which the vehicle velocity V does not reach a predetermined vehicle velocity V1 of FIG. 14, the centrifugal force can not overcome the pressing force F, and hence $$F > \Delta P \cdot e$$

results and the weight does not work. In consequence, as in FIG. 9, the relief hole 72 remain blocked by the check ball 73. The torque characteristic at that time results in a high torque characteristic as indicated at M in FIG. 14. When the vehicle velocity V exceeds the vehicle velocity V1, the centrifugal force allows the weight 54 to pivot outward. When the weight 54 pivots, the pin 66 moves as shown in FIG. 8 to allow the check ball 73 to open the relief hole 72. At that time, a switching occurs from the high torque transmission characteristic M to the low torque transmission characteristic N as indicated by an arrow O of FIG. 14. A switching point where the high torque transmission characteristic M is switched to the low torque transmission characteristic N is given as $$F = \Delta P \cdot e + (\text{centrifugal force})$$

In this case, the variations of the area of flow passage A relative to the amount of displacement x of the check ball 73 and thus the variations of the torque transmission characteristics relative to the variance of flow rate will become gentler since the accommodation hole 74 for the check ball 73 has the two-step flared portions consisting of the first-step flared portion 75 and the second-step flared portion 76, thereby reducing the influences on the vehicle behaviors.

When the vehicle velocity V lowers from the vehicle velocity V1 to the vehicle velocity V2 after the switching to the low torque transmission characteristic M, the centrifugal force decreases allowing the weight 54 to return to its original position. For this reason, as shown in FIG. 9, the check ball 73 is pressed by the pin 66 to close the relief valve 72. This allows the low torque transmission characteristic N of FIG. 14 to be gently switched to the high torque transmission characteristic M. The vehicle velocity V2 at which switching is made from the low torque transmission characteristic N to the high torque transmission characteristic M is given as $$F = \Delta P \cdot e + D + (\text{centrifugal force})$$

That is, by restricting the area of flow passage A after relief opening to be a certain value L irrespective of the amount of displacement x of the check ball 73, it is possible to increase the drag D to which the check ball 73 is subjected, whereupon as in FIG. 14 a hysteresis of velocity width R can be provided at the switching point V1 where the high torque transmission characteristic M is switched to the low torque transmission characteristic N and at the switching point V2 where the low torque transmission characteristic N is switched to the high torque transmission characteristic M. It is therefore possible to prevent the torque transmission characteristics from being frequently switched even though variances in velocity occur during the travel at a certain velocity, thereby reducing the influences on the vehicle behaviors.

According to the present invention as set forth hereinabove, the influences on the vehicle behaviors can be reduced by diminishing the torque variance speeds by making gentler the variations of the area of flow passage relative to the amount of displacement of the check ball in the torque varying mechanism and thus the variations of the torque transmission characteristics relative to the variances of the flow rate. The hysteresis can be provided at the switching point where the high torque transmission characteristic is switched to the low torque transmission characteristic when the vehicle velocity increases and at the switching point where the low torque transmission characteristic is switched to the high torque transmission characteristic when the vehicle velocity decreases, thereby making it possible to prevent the torque transmission characteristics from being frequently switched upon the constant velocity travel and thus to-diminish the influences on the vehicle behaviors.

It will be appreciated that the present invention is not intended to be limited to the above embodiments and that it covers any appropriate variants without impairing its objects and advantages. The present invention is not restricted by the numerical values shown in the above embodiments.

What is claimed is:

1. A hydraulic power transmission joint adapted to be interposed between an input shaft and an output shaft that are rotatable relative to each other, to transmit torque as a function of the rotational-speed difference between said input-and output shafts, said hydraulic power transmission joint comprising:

a housing coupled to one of said input and output shafts and having a cam face formed on its inner side surface;

a rotor coupled to the other of said input and output shafts and being rotatably accommodated in said housing, said rotor having a plurality of axially extending plunger chambers;

a plurality of plungers each being reciprocatively accommodated in each of said plurality of plungers under a biasing force of return springs, said plurality of plungers being operated by said cam face upon the relative rotations of said input and output shafts;

an orifice formed in a valve block coupled to said rotor, for generating a flow resistance under the action of flow of oil discharged by operations of said plurality of plungers; and a torque varying mechanism provided in said valve block and having a weight that is pivoted by a centrifugal force to allow a check ball to move to open a relief hole, for the relief of hydraulic pressure, thereby switching a first torque transmission characteristic to a second torque transmission characteristic lower than the first one, wherein said torque varying mechanism includes an accommodation hole for receiving said check ball therein, said relief hole being formed in the bottom of said accommodation hole, said accommodation hole being configured such that the area of flow passage between said accommodation hole and the said check ball increases linearly as a function of the amount of displacement of said check ball after opening of said relief hole, after which said area of flow passage keeps an unvarying value, whereby a hysteresis characteristic is obtained in which when a predetermined first vehicle velocity is reached, said weight pivots to allow said check ball to move to open said relief hole, thereby effecting a switching from said first torque transmission characteristic to said second torque transmission characteristic lower than said first one, and in which when the vehicle velocity drops from said first vehicle velocity to said second vehicle velocity lower than the first one, said weight returns to its original position to allow said check ball to close said relief hole, thereby effecting a switching from said second torque transmission characteristic to said first torque transmission characteristic.

2. A hydraulic power transmission joint according to claim 1, wherein said accommodation hole is flared in section with a plurality of steps from an opening of said relief hole toward an opening of said accommodation hole.

3. A hydraulic power transmission joint according to claim 2, wherein said accommodation hole has in section a flared portion with a plurality of steps from said opening of said relief hole toward said opening of said accommodation hole, said accommodation hole further having a straight portion contiguous with said flared portion in the direction of flare.

* * * * *